US009922383B2

(12) United States Patent
George

(10) Patent No.: US 9,922,383 B2
(45) Date of Patent: Mar. 20, 2018

(54) PATENT CLAIMS ANALYSIS SYSTEM AND METHOD

(71) Applicant: SPORE, INC., Durham, NC (US)

(72) Inventor: JiNan Glasgow George, Durham, NC (US)

(73) Assignee: SPORE, INC., Durham, NC (US)

( * ) Notice: Subject to any disclaimer, the term of this patent is extended or adjusted under 35 U.S.C. 154(b) by 17 days.

(21) Appl. No.: 15/241,578

(22) Filed: Aug. 19, 2016

(65) Prior Publication Data

US 2016/0358274 A1 Dec. 8, 2016

Related U.S. Application Data

(63) Continuation-in-part of application No. 14/822,405, filed on Aug. 10, 2015, now Pat. No. 9,430,756, which is a continuation of application No. 12/633,917, filed on Dec. 9, 2009, now Pat. No. 9,104,648, which is a continuation of application No. 10/983,458, filed on Nov. 8, 2004, now Pat. No. 7,644,360.

(60) Provisional application No. 60/518,119, filed on Nov. 7, 2003.

(51) Int. Cl.
| | |
|---|---|
| *G06F 3/0482* | (2013.01) |
| *G06F 17/22* | (2006.01) |
| *G06Q 50/18* | (2012.01) |
| *G06Q 10/10* | (2012.01) |
| *G06F 17/30* | (2006.01) |
| *G06F 3/0484* | (2013.01) |

(52) U.S. Cl.
CPC ......... *G06Q 50/184* (2013.01); *G06F 3/0482* (2013.01); *G06F 3/04842* (2013.01); *G06F 17/2241* (2013.01); *G06F 17/30268* (2013.01); *G06F 17/30274* (2013.01); *G06F 17/30554* (2013.01); *G06F 17/30589* (2013.01); *G06F 17/30867* (2013.01); *G06Q 10/10* (2013.01)

(58) Field of Classification Search
CPC . G06F 17/2241; G06F 3/0482; G06F 3/04842
See application file for complete search history.

(56) References Cited

U.S. PATENT DOCUMENTS

| | | | | | |
|---|---|---|---|---|---|
| 5,774,833 | A | * | 6/1998 | Newman ............... | G06F 17/211 704/9 |
| 6,049,811 | A | * | 4/2000 | Petruzzi ................. | G06F 17/24 715/255 |
| 6,078,327 | A | * | 6/2000 | Liman ................... | G06F 3/0481 715/854 |
| 6,271,846 | B1 | * | 8/2001 | Martinez ............... | G06F 3/0482 715/854 |

(Continued)

*Primary Examiner* — Scott Baderman
*Assistant Examiner* — Mario M Velez-Lopez
(74) *Attorney, Agent, or Firm* — NEO IP

(57) ABSTRACT

A system and method for facilitating examination of technology content related to patent grant claims; including the functions of importing of patent claims, parsing of the claims into their elements and sub-elements, semantically analyzing the claims sub-elements to determine the technology; semantically analyzing the database records to find matching technology content, displaying the matching technology content, and visually linking the matching technology content to relevant hierarchically-displayed elements and sub-elements.

15 Claims, 14 Drawing Sheets

(56) References Cited

U.S. PATENT DOCUMENTS

| | | | | |
|---|---|---|---|---|
| 6,298,327 B1* | 10/2001 | Hunter | G06F 17/243 | 705/1.1 |
| 6,339,767 B1* | 1/2002 | Rivette | G06F 17/30011 | 707/781 |
| 6,499,026 B1* | 12/2002 | Rivette | G06F 17/30011 | |
| 7,290,223 B2* | 10/2007 | Decombe | G06F 3/0481 | 715/810 |
| 7,353,464 B1* | 4/2008 | Kundu | G06F 17/30392 | 707/999.01 |
| 7,739,133 B1* | 6/2010 | Hail | G06Q 40/00 | 705/2 |
| 7,770,107 B2* | 8/2010 | Jiang | C12Q 1/6806 | 715/234 |
| 8,196,030 B1* | 6/2012 | Wang | G06K 9/00442 | 345/581 |
| 8,352,465 B1* | 1/2013 | Jing | G06F 17/30867 | 707/723 |
| 2001/0049707 A1* | 12/2001 | Tran | G06Q 10/10 | 715/256 |
| 2002/0000998 A1* | 1/2002 | Scott | G06F 17/30274 | 345/667 |
| 2002/0022974 A1* | 2/2002 | Lindh | G06F 17/30716 | 705/3 |
| 2002/0107896 A1* | 8/2002 | Ronai | G06F 17/21 | 715/261 |
| 2002/0184254 A1* | 12/2002 | Williams | G06F 17/211 | 715/255 |
| 2002/0188608 A1* | 12/2002 | Nelson | G06F 21/10 | |
| 2003/0014415 A1* | 1/2003 | Weiss | G06F 17/30905 | |
| 2003/0061243 A1* | 3/2003 | Kim | G06F 17/3061 | |
| 2003/0065637 A1* | 4/2003 | Glasgow | G06Q 10/10 | |
| 2003/0154204 A1* | 8/2003 | Chen-Wright | G06F 17/30607 | |
| 2004/0015481 A1* | 1/2004 | Zinda | G06F 17/3061 | |
| 2004/0078192 A1* | 4/2004 | Poltorak | G06F 17/2715 | 704/9 |
| 2004/0243387 A1* | 12/2004 | De Brabander | G06F 8/34 | 704/1 |
| 2005/0071349 A1* | 3/2005 | Jordan | G06F 17/30592 | |
| 2005/0234685 A1* | 10/2005 | Tanigawa | G06Q 10/10 | 703/2 |
| 2007/0022110 A1* | 1/2007 | Suda | G06F 17/3071 | |
| 2007/0233692 A1* | 10/2007 | Lisa | G06F 17/30651 | |
| 2007/0294664 A1* | 12/2007 | Joshi | G06F 9/4443 | 717/109 |
| 2010/0190143 A1* | 7/2010 | Gal | G09B 7/00 | 434/322 |

* cited by examiner

The invention provides biomedical devices. In particular, the invention provides biomedical devices on the surfaces of which stable, hydrophilic, amide-containing coatings are formed.

1. A method for manufacturing biomedical devices comprising the step of contacting at least one surface of a biomedical device, the surface comprising an effective amount of carboxyl groups, with a coating effective amount of an amine and a coupling effective amount of at least one coupling agent at a temperature of about 0 to about 95. degree. C. and for a time of about 1 to about 380 minutes to produce a stable, amide-containing coating on the surface.

10. A method for manufacturing biomedical devices comprising the steps of a.) coating at least one surface of a device with one or more carboxyl functional polymers; and b.) contacting the at least one surface with a coating effective amount of an amine and a coupling effective amount of at least one coupling agent at a temperature of about 0 to about 95. degree. C. and for a time of about 1 to about 380 minutes to produce a stable, amide-containing coating on the surface.

29. A contact lens comprising at least one surface having an amide-containing coating coupled thereto by at least one coupling agent.

|     | 301 | 302 | 303 | 304 | 305 | 306 |
|-----|-----|-----|-----|-----|-----|-----|
| 201 | X   |     | X   | X   | X   | X   |
| 202 | X   | X   | X   | X   | X   | X   |
| 203 |     | X   | X   | X   |     | X   |
| 204 | X   | X   | X   |     |     | X   |

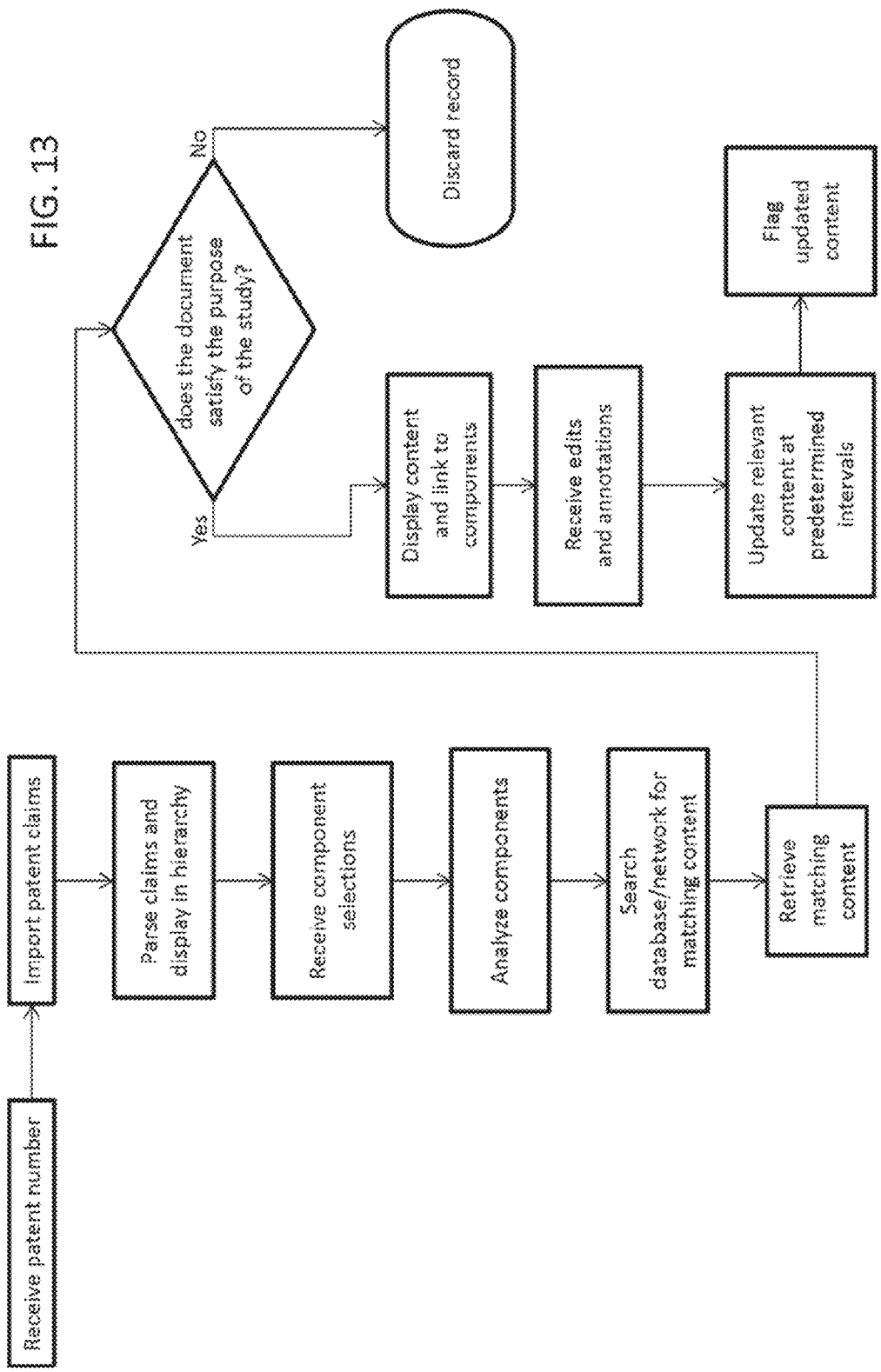

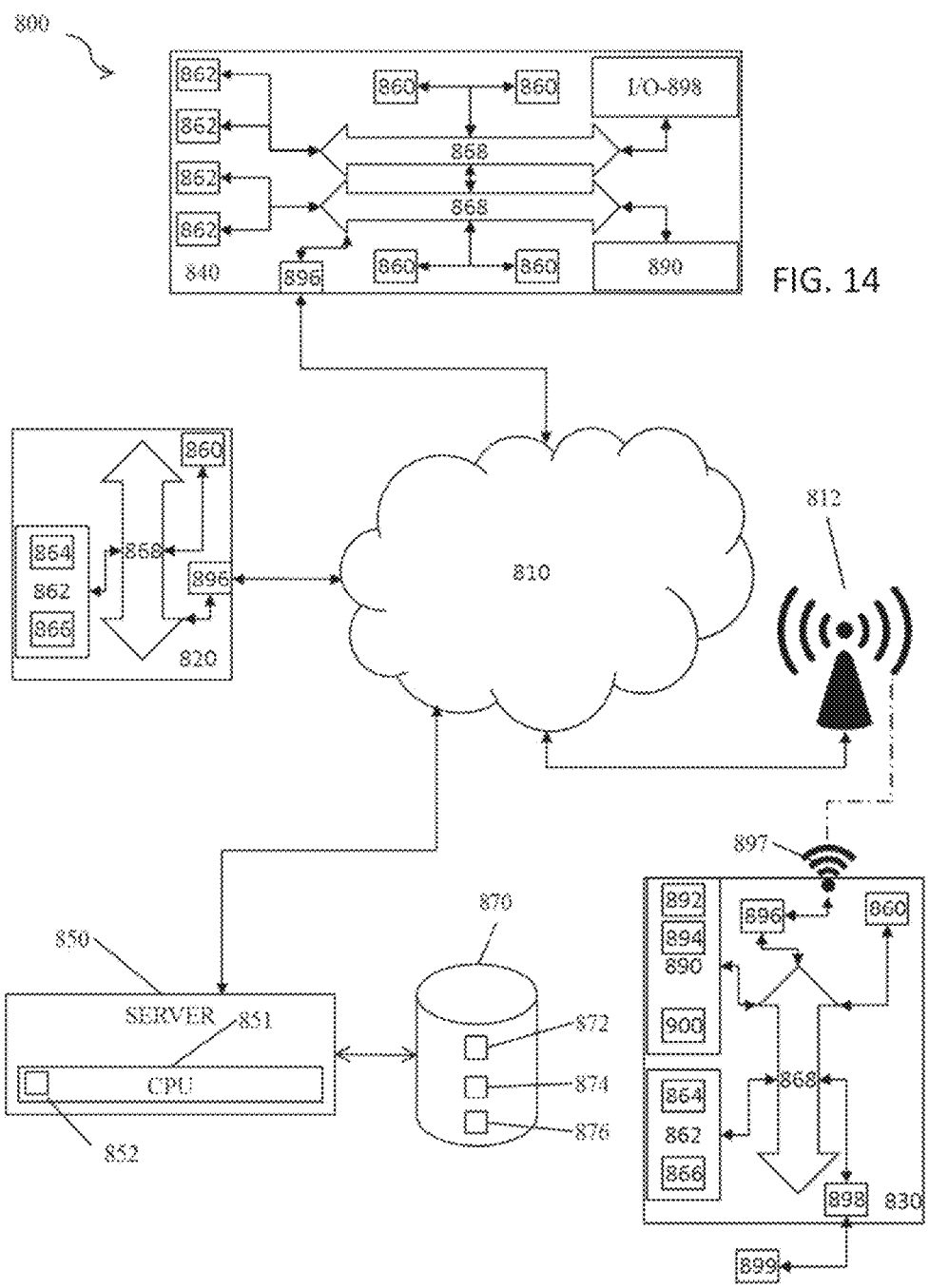

PATENT CLAIMS ANALYSIS SYSTEM AND METHOD

CROSS-REFERENCE TO RELATED APPLICATIONS

This non-provisional utility patent application claims priority from and is a continuation-in-part of U.S. application Ser. No. 14/822,405, filed on Aug. 10, 2015, which is a continuation of U.S. application Ser. No. 12/633,917, filed on Dec. 9, 2009; which is a continuation of U.S. application Ser. No. 10/983,458, filed on Nov. 8, 2004, which claims the priority filing benefit of U.S. Provisional Patent No. 60/518,119 filed Nov. 7, 2003, each of which is hereby incorporated by reference in its entirety.

BACKGROUND OF THE INVENTION (1) Field of the Invention

The present invention relates generally to automated work systems and, more particularly, to an automated work system for examining patent grant and patent application claims.

(2) Description of the Prior Art

The number of patent applications is increasing yearly. From 1963 through 1983, approximately 100,000 patent applications per year were filed at the United States Patent & Trademark Office (USPTO), whereas in 2001 alone, 326,508 patent applications were filed. Technology innovation, which needs patent protection to attract capital for development and commercialization, is driving this trend. Interestingly, technology is also facilitating the trend: word processing, remote electronic database searching, and similar technologies are facilitating the patent application process, both for high-technology and low-technology inventions. This large increase in patent applications, and patents in general, means that the ability to understand and communicate one's patent property and competitive position with respect to a large field of other patent property is a difficult task, and is only becoming more difficult with time.

In addition to the growth in patent applications, the number of claims filed with each application is increasing. Patent applications with several hundred claims are now routine. Some patent applications with claims in the 1000's also exist. A patent with 7976 claims is the inventors' current identified maximum. This trend is at least in part due to the patent legal precedent now governing claims interpretation deriving from the case of Festo Corporation v. Shoketsu Kinzoku Kogyo Kabushiki Co. Ltd. In this case, the courts interpreted that narrowing amendments to claims elements made to overcome the patent examiner's objections during prosecution of a patent application can significantly limit patent claims scope by eliminating the doctrine of equivalents and invoking prosecution history estoppel for the amended claims element.

Thus, a need exists for an automated method and system to reduce the amount of information users need to review in order to make a judgment relating to the claims of a patent or patent application.

SUMMARY OF THE INVENTION

The present invention provides a system, method, and/or a graphical user interface for analyzing patent claims, retrieving relevant technology content, and displaying the patent claims and relevant technology content, the system including: at least one input device in communication with a computer and at least one output device, wherein at least one user is capable of inputting information via the at least one input device to the at least one computer and viewing information on the at least one output device, and wherein the at least one computer is capable of storing, modifying, outputting, and retrieving information in communication with the at least one input device and at least one output device; and software installed and capable of running on the at least one computer for automatically importing patent claims based upon the user inputted information, parsing the patent claims hierarchically, generating a hierarchical claims diagram, and outputting a viewable diagram of the parsed claims; wherein the claims diagram shows at least part of a patent claims series in an interactive format that permits expansion and compression of the at least part of a patent claims series according to the hierarch of the at least part of a patent claims series; and wherein the software is operable for receiving sub-element selections, analyzing the sub-element selections for technology content, searching the at least one database for matching technology content, retrieving the matching technology content, receiving a study purpose; analyzing in real-time a matching technology content record for matching study purpose, retrieving in real-time the matching technology and study purpose content, displaying matching technology and study purpose content thumbnail images beside the patent claims diagram, and displaying matching technology content thumbnail images beside the patent claims diagram, and linking the thumbnail images to their sub-element.

These and other aspects of the present invention will become apparent to those skilled in the art after a reading of the following description of the preferred embodiment when considered with the drawings.

BRIEF DESCRIPTION OF THE DRAWINGS

FIG. 6 is a screen view of an automated system according to the present invention.

FIG. 7 is a screen view of an automated system according to the present invention.

FIG. 12 is a prior art diagram of a prior art claims infringement matrix.

FIG. 13 is a flow diagram of a process according to the present invention.

FIG. 14 is a schematic of a computer network system according to the present invention.

DETAILED DESCRIPTION OF THE PREFERRED EMBODIMENTS

Figure 1:
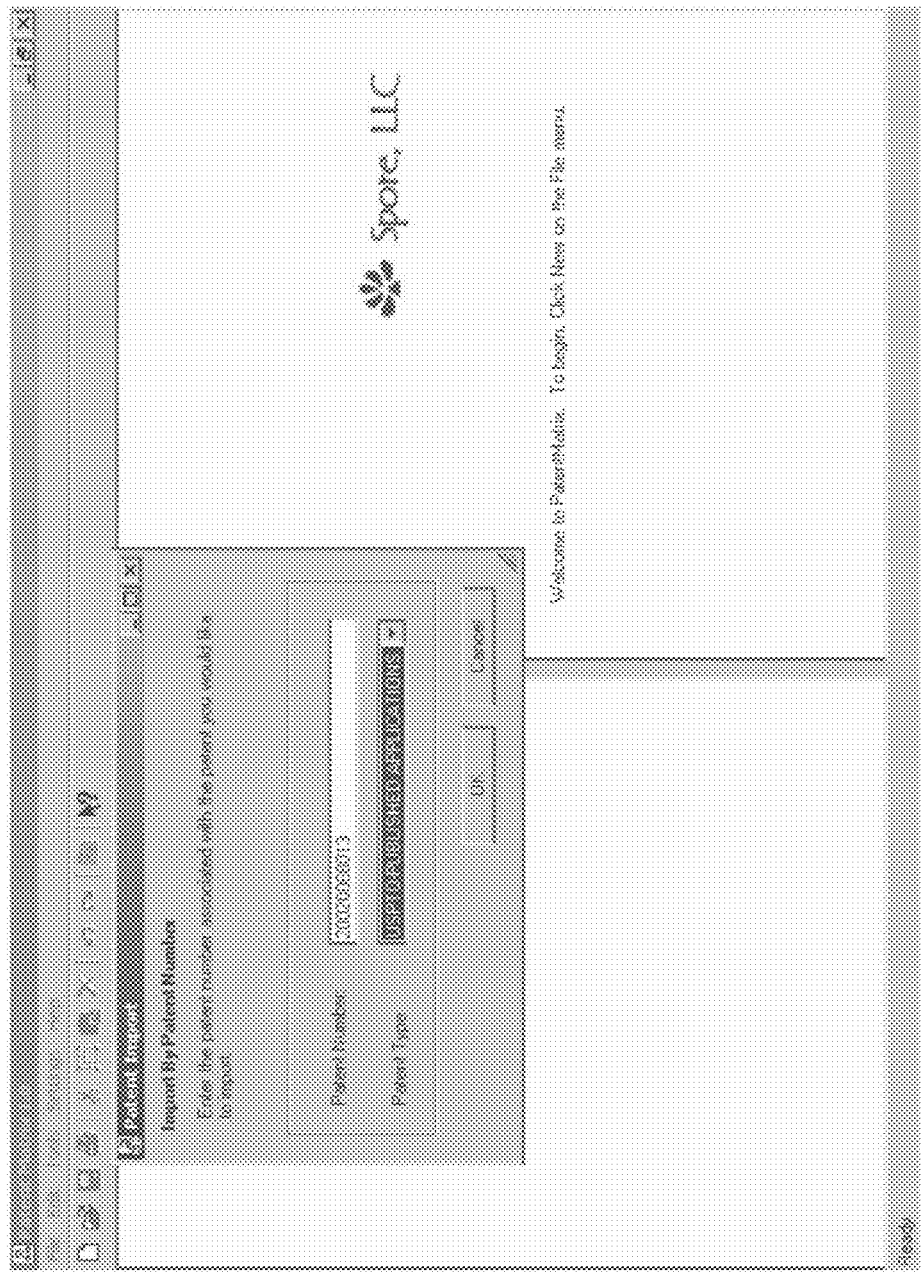
FIG. 1 is a screen view of an automated system according to the present invention.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms. Referring now to the drawings in general, the illustrations are for the purpose of describing a preferred embodiment of the invention and are not intended to limit the invention thereto.

The Patent Matrix system was developed as a methodology and then as a software tool to facilitate patent examination and patent application drafting. The users of the software include patent portfolio managers, inventors, technology assessors, patent attorneys and agents, and patent examiners. A primary goal of the software is to reduce the amount of information users need to review in order to make a judgment relating to the claims of a patent or patent application.

Importing patent or publication claims directly from United States Patent Office website—Although all sections of a patent include important information, the business and legal value of a patent resides in the claims. With an annual patent application growth rate of approximately 11% and number of claims per patent routinely in the 100's and occasionally in the 1000's, the ability to rapidly and consistently review claims is essential in order to keep pace with the growing patent prior art.

To assist in rapid review of claims, Spore has developed the Patent Matrix software to perform these essential functions: automated import of patent claims, automated parsing of the claims into their hierarchy, and compression/expansion functionality of the parsed claims to/from the independent claim level.

The software and system used to generate the claims diagrams, also referred to as Patent Matrix diagrams are operable to automatically and substantially instantly import issued or granted patents and patent application publications (grants/applications) directly from US Patent Office website or other database housing documents or patents, by simply selecting "File, Import", typing in the grant/application number, and selecting the appropriate database. In the example shown in FIG. 1, a graphic user interface on a computer screen is shown with interactive elements permits a user to enter a document identifier, in this example, the document identifier is a number: US patent application 20020068013 is being imported from a predetermined database of documents or data, in this example, the US published patent applications database.

Claims Display—A method of the present invention includes the steps of: a user entering/inputting a unique grant/application identifier into the software via a graphical user interface (GUI) or prompt; the software identifying the grant/publication from a database using the unique identifier; importing/selecting the grant/application from the database; parsing the claims to separate each claim as an element of a Patent Matrix diagram; arranging the claims in a hierarchy according to the claims numbering and relationship to other claims; compressing the claims in the hierarchy to display at least only the independent claims to the user via the GUI; the user selectively expanding the compressed claims and compressing the expanded claims as desired.

Figure 2:
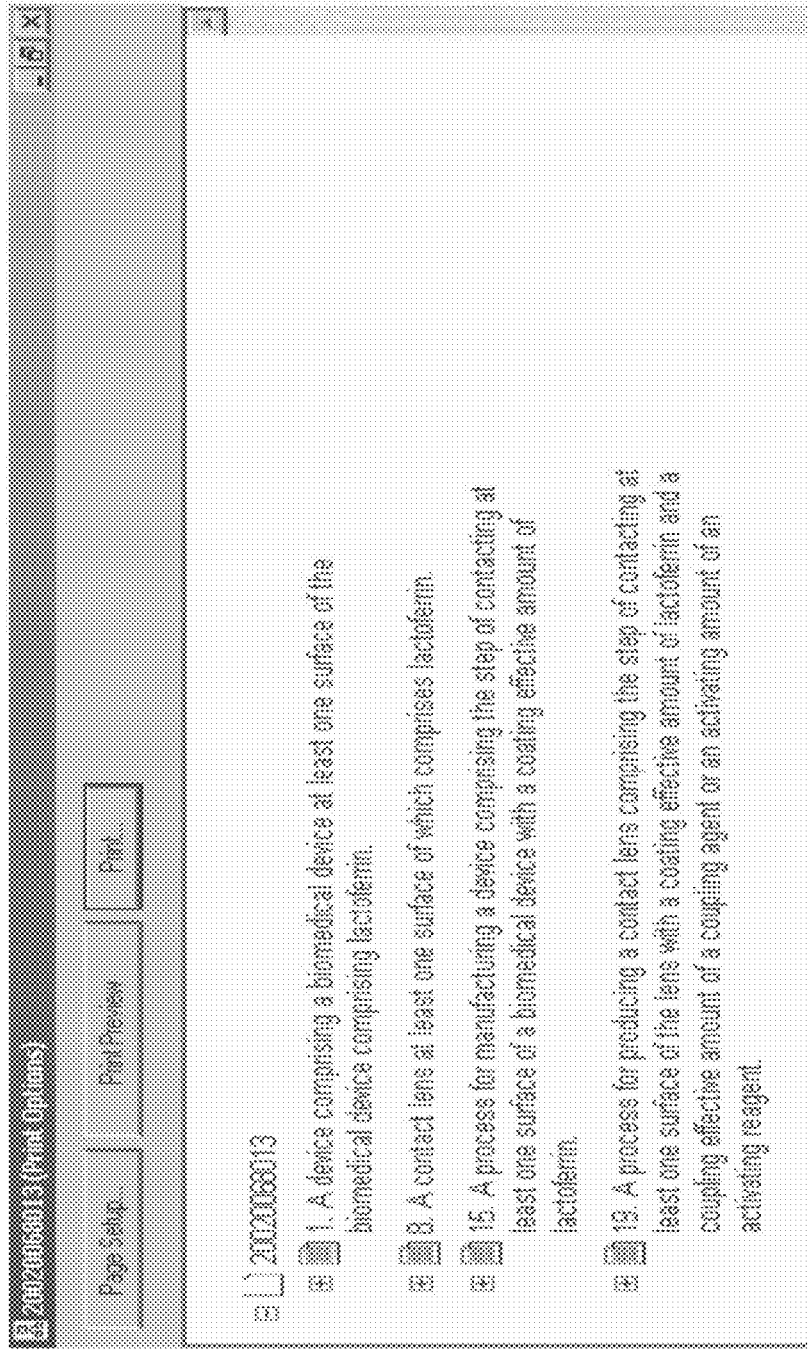
FIG. 2 is a screen view of an automated system according to the present invention.

The document, grant, and/or application is imported, parsed into its hierarchical order, and compressed to the highest level for initial display on an interactive graphical user interface of a computer screen or electronic display, as shown in FIG. 2. The independent claims of US Pub. No. 20020068013 alone are displayed initially, claims 1, 8, 15, and 19 of US Pub. No. 20020068013; a plus sign indicator to the left of the independent claim number indicates whether or not sub-elements (parsed elements of the independent claim) and/or dependent claims are available to be shown in an expanded, or uncompressed view. Alternative indicators may be used, such as a number following the claim text indicating the number of compressed elements connected to that independent or higher level element. Note also that sub-elements may also have compressed elements associated with them, even though the sub-elements are not themselves independent claims or the highest level in a hierarchical relationship.

The diagrammatic user interactive compression of claims is particularly useful for persons examining large numbers of grants/applications. The user can quickly look at the independent claims to ascertain if the claims are relevant to the technology being examined. Dependent claims normally only further delimit independent claims. Therefore, usually if an invention falls outside of the scope of an independent claim, there is no need to further examine the dependent claims. For grants/applications where the claims are close to describing the examined invention, these claims should be examined in details.

Figure 3:
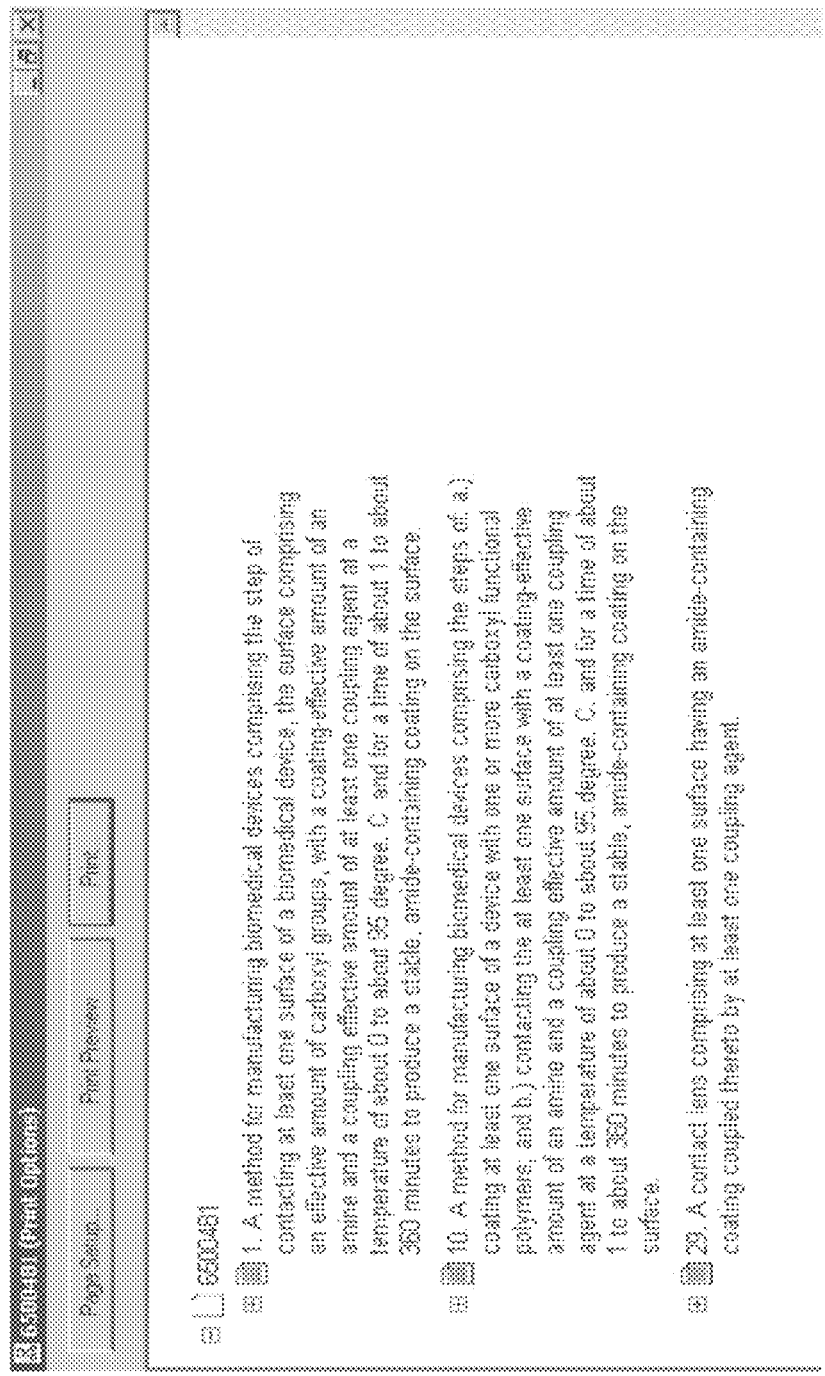
FIG. 3 is a screen view of an automated system according to the present invention.

The independent claims can also be compared to other grants/applications by opening two or more grants/applications in the Patent Matrix. Shown in FIG. 3 is an issued U.S. Pat. No. 6,500,481 related to the technology of the preceding application. Once again, compressed claims are shown in the diagram: claims 1, 10, and 20 are the independent claims series for U.S. Pat. No. 6,500,481. The plus sign to the left of each of these claims numbers indicates that some sub-element or dependent claim exists under each compressed claim in the diagram. Note how much easier it is to compare these two inventions when only the independent claims are visible. Compare this method with a claims comparison using the entire grants/applications by retrieving these patents from the USPTO website.

Figure 4:
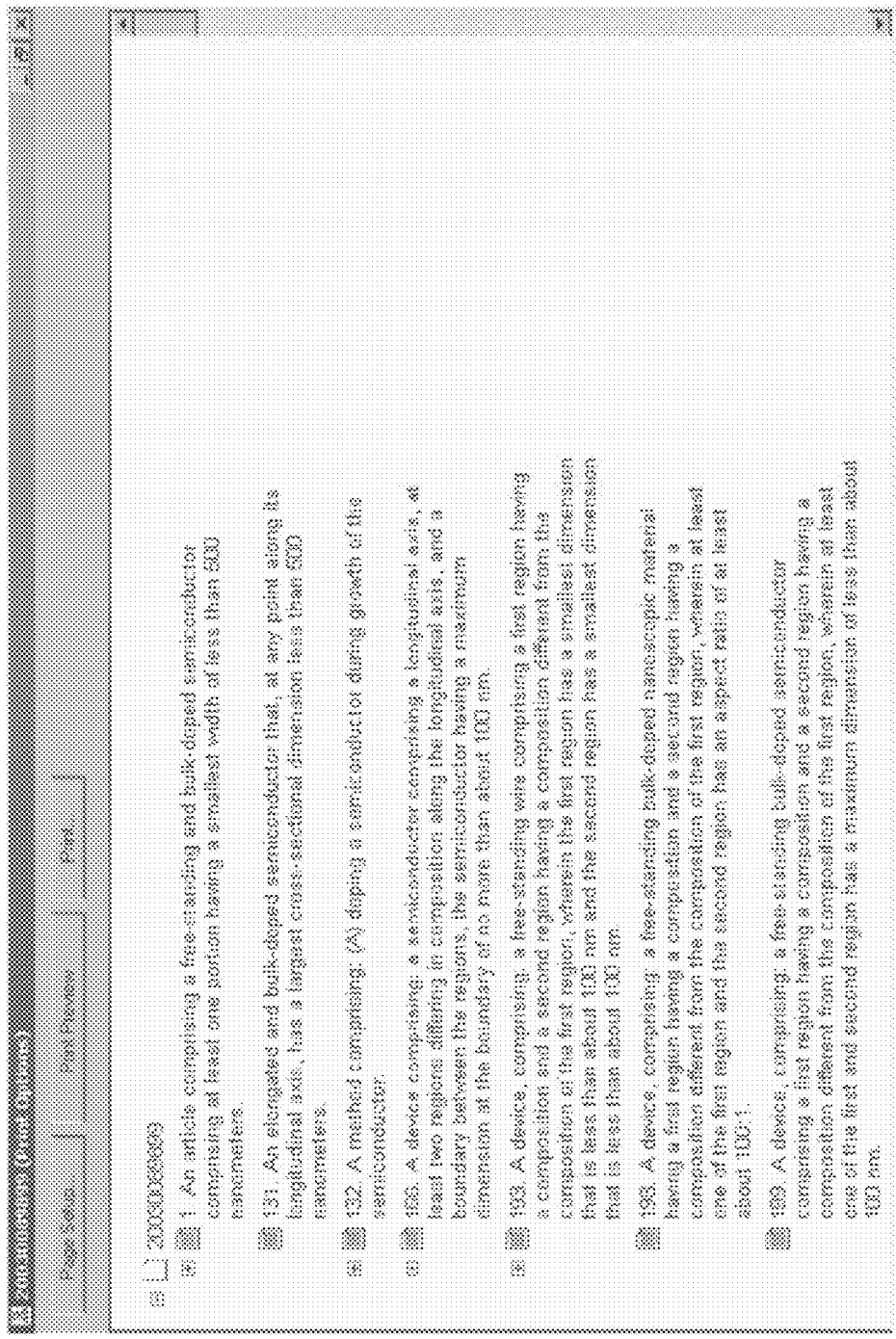
FIG. 4 is a screen view of an automated system according to the present invention.

The utility of the Patent Matrix software increases as the number of claims increases. For example, US Patent Application 20030089899 was imported using the Patent Matrix software. Shown in FIG. 4 is a screen shot of the first seven (7) independent claims. Note how easy it his to examine the seven independent claims without the intervening 192 dependent claims. This is one of the patent applications with a large number of claims mentioned earlier—709 total claims and 72 independent claims. Additionally, independent series of claims can be group by moving claims series up or down relative to one another.

Figure 5:
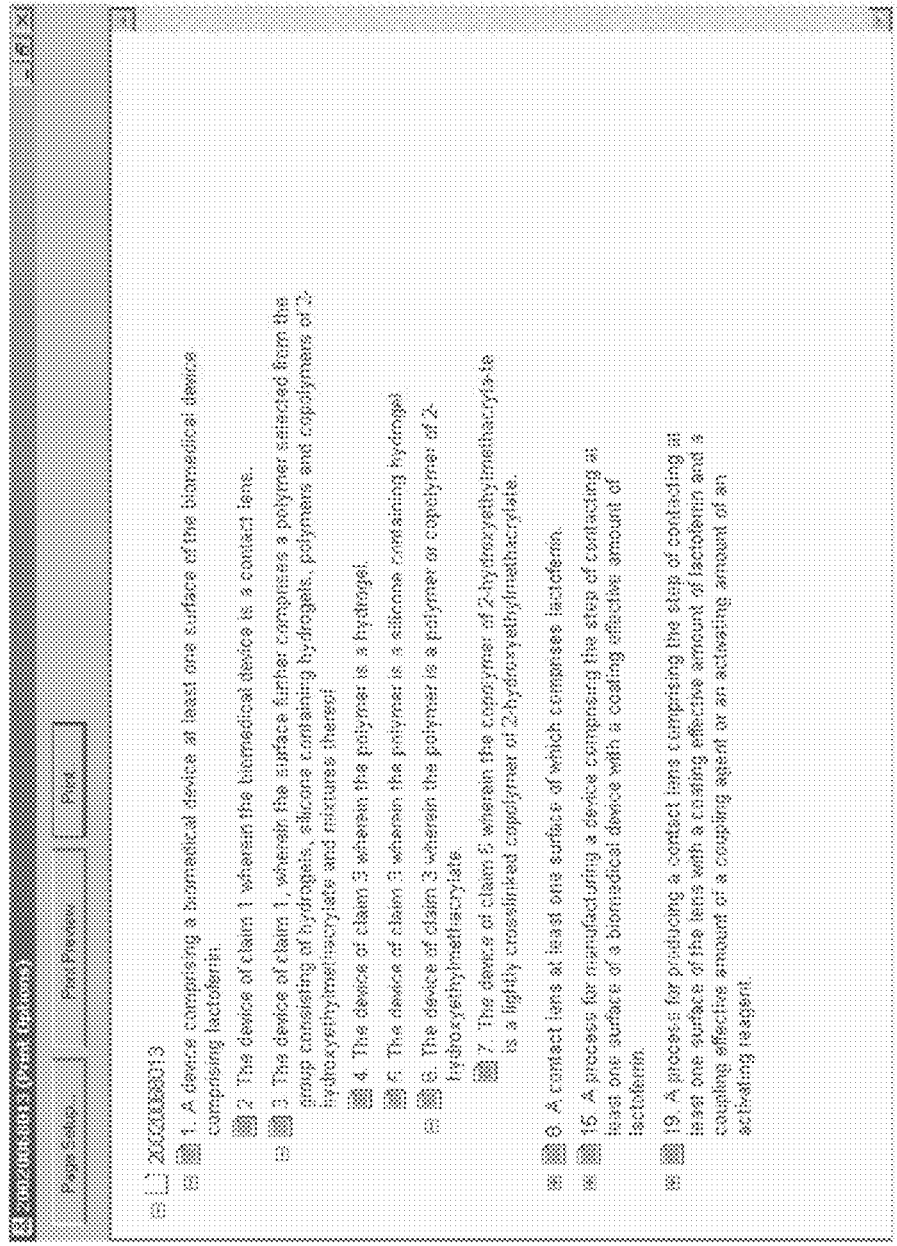
FIG. 5 is a screen view of an automated system according to the present invention.

Expanding the claims to view dependent claims—For grants and/or applications where the independent claims are close to describing the examined invention and may cover the invention, the claims should be examined in detail, including the dependent claims. Independent claim #1 from the US Application 20020068013 has been completely expanded, as shown in FIG. 5. Note the hierarchical dependency of dependent claims 2 through 7, automatically created by the Patent Matrix software import function.

Figure 7:
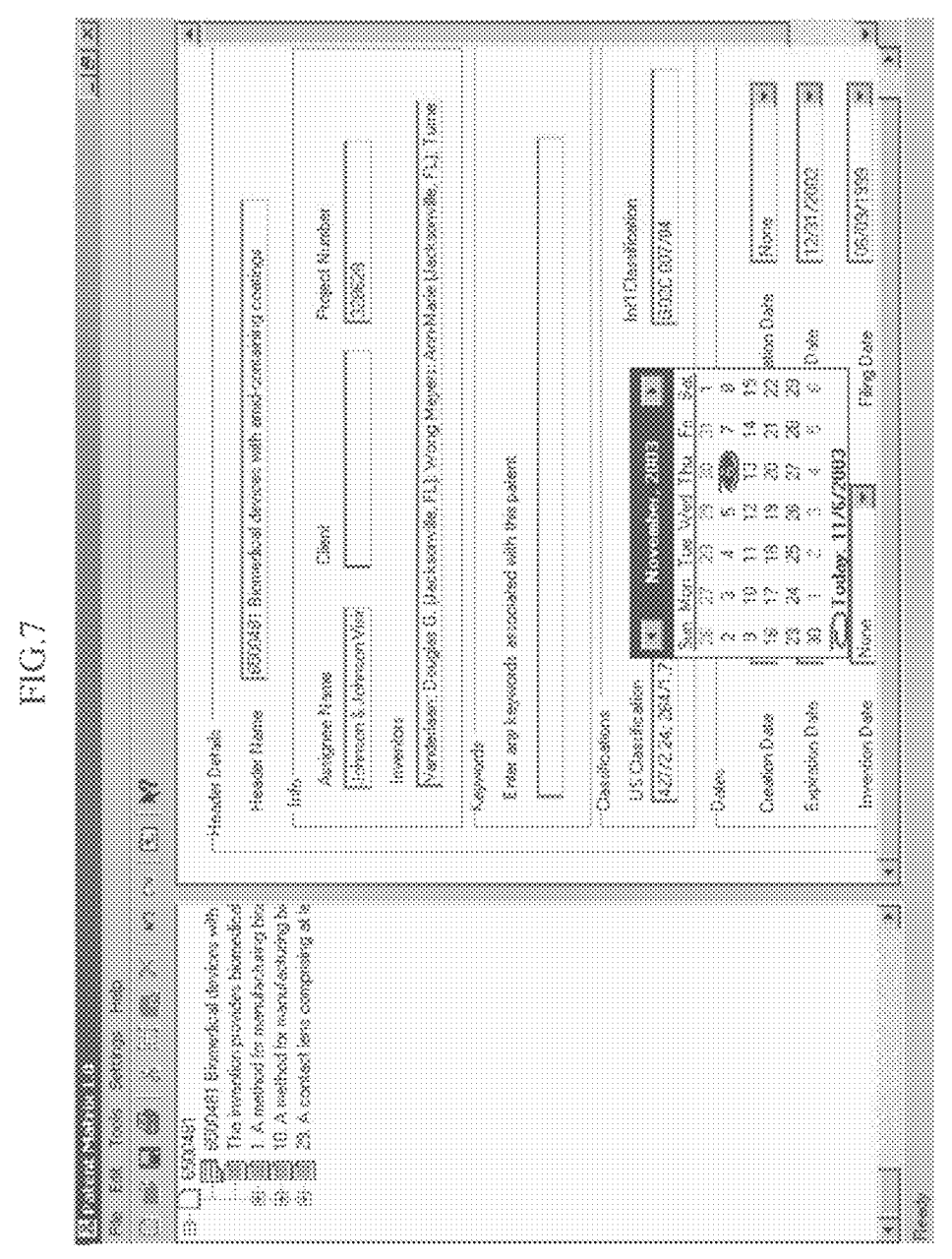

Other fields—In a preferred embodiment of the present invention, the Patent Matrix software also imports other important fields from a grant/application. In addition to the abstract, as shown in FIG. 6, the filing date, inventors, assignees, etc. are imported into their respective fields in the grant/application header, shown in FIG. 7. The date fields include a pop-up calendar to check or change the date and avoid confusion with International/LTS date formats. This header information facilitates the use of Patent Matrix files in an invention or disclosure management system.

Figure 8:
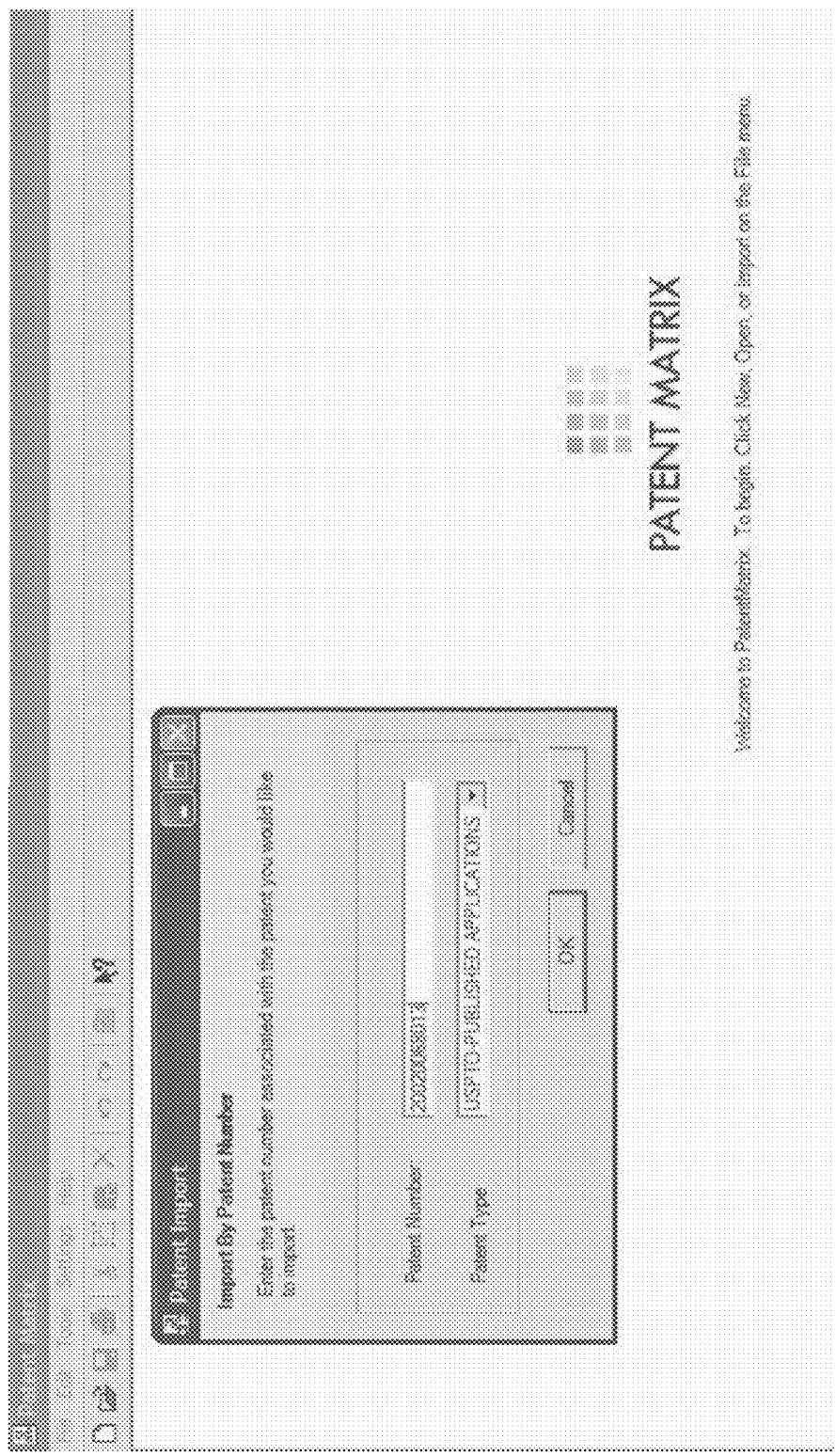
FIG. 8 is another user interface of a compressed claims diagram.
Figure 9:
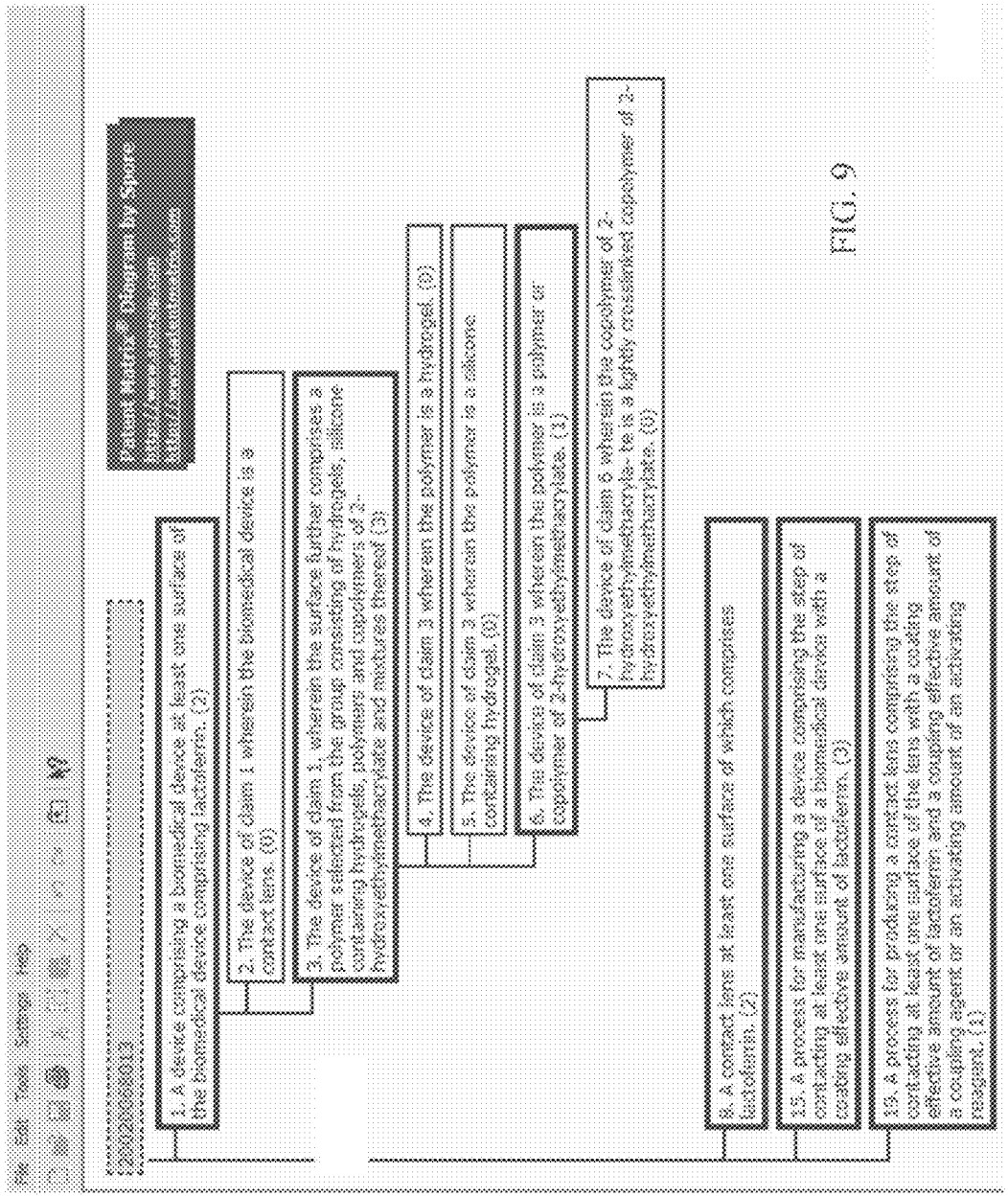
FIG. 9 is another user interface of an expanded view for the claims diagram for the document shown in FIG. 8.

FIG. 8 is another user interface of a compressed claims diagram. In this example, outlining of elements and sub-elements is provided to further enhance user viewing and analysis, as well as interaction with the diagram and its elements. Coloration, as well as shading and/or font changes may be used to further distinguish hierarchical elements and sub-elements. FIG. 9 is another user interface of an expanded view for the claims diagram for the document shown in FIG. 8.

Thus, the present invention provides a system for displaying patent claims, the system including: at least one input device in communication with a computer and at least one output device, wherein at least one user is capable of inputting information via the at least one input device to the at least one computer and viewing information on the at least one output device, and wherein the at least one computer is capable of storing, modifying, outputting, and retrieving information in communication with the at least one input device and at least one output device; and software installed and capable of running on the at least one computer for automatically importing patent claims based upon the user inputted information, parsing the patent claims hierarchically, generating a hierarchical claims diagram, and outputting a viewable diagram of the parsed claims; wherein the claims diagram shows at least part of a patent claims series in an interactive format that permits expansion and compression of the at least part of a patent claims series according to the hierarch of the at least part of a patent claims series.

Furthermore, the present invention system provides for at least part of a claim series to include an independent claim, sub-element(s) of the independent claim, at least one dependent claim, sub-element(s) of the dependent claim(s), and combinations thereof. The system, GUI, and methods are operable to permit the claims to be displayed in compressed or expanded views or states. The interactive GUI permits the user to click select which of the independent claim, at least one dependent claim, sub-element(s) of the dependent claim(s), and combinations thereof to compress or expand, and the reverse, with the default state showing the compressed view initially in a preferred embodiment of the present invention.

The imported claims include an entire claims series, an entire patent's claims, multiple patents' claims, and/or at least part of a patent claims series from more than one patent. Further subcomponent parsing is optionally provided for the user.

In the system, the computer is a single computer, a server, or a computer network. The at least one input device communicates with the computer directly, remotely, wirelessly, via the Internet, and combinations, depending upon the system. The at least one output devices is an electronic output device with graphic user interface.

The present invention further provides for a method for displaying patent claims, the method steps comprising:
 a. providing a system as in the foregoing;
 b. selecting at least part of a patent claims series;
 c. importing the at least part of a patent claims series into the data processor running the software;
 d. parsing the at least part of a patent claims series into the claims hierarchy of at least part of a patent claims series;
 e. displaying the parsed at least part of a patent claims series in an interactive format that permits expansion and compression of the at least part of a patent claims series according to the hierarch of the at least part of a patent claims series.

As in the foregoing system, the method provides for steps operable to provide for at least part of a claim series to include an independent claim, sub-element(s) of the independent claim, at least one dependent claim, sub-element(s) of the dependent claim(s), and combinations thereof. The system, GUI, and methods are operable to permit the claims to be displayed in compressed or expanded views or states. The interactive GUI permits the user to click select which of the independent claim, at least one dependent claim, sub-element(s) of the dependent claim(s), and combinations thereof to compress or expand, and the reverse, with the default state showing the compressed view initially in a preferred embodiment of the present invention.

The present invention further provides for an interactive user interface for providing a diagram of patent claims, the diagram including:
 an interactive graphical user interface (GUI) viewable on an electronic display, the GUI including a diagram of at least part of a patent claims series;
 wherein the claims are parsed hierarchically
 and the claims are compressible hierarchically.

Furthermore, the GUI of the present invention system provides for at least part of a claim series to include an independent claim, sub-element(s) of the independent claim, at least one dependent claim, sub-element(s) of the dependent claim(s), and combinations thereof. The system, GUI, and methods are operable to permit the claims to be displayed in compressed or expanded views or states. The interactive GUI permits the user to click select which of the independent claim, at least one dependent claim, sub-element(s) of the dependent claim(s), and combinations thereof to compress or expand, and the reverse, with the default state showing the compressed view initially in a preferred embodiment of the present invention.

Figure 10:
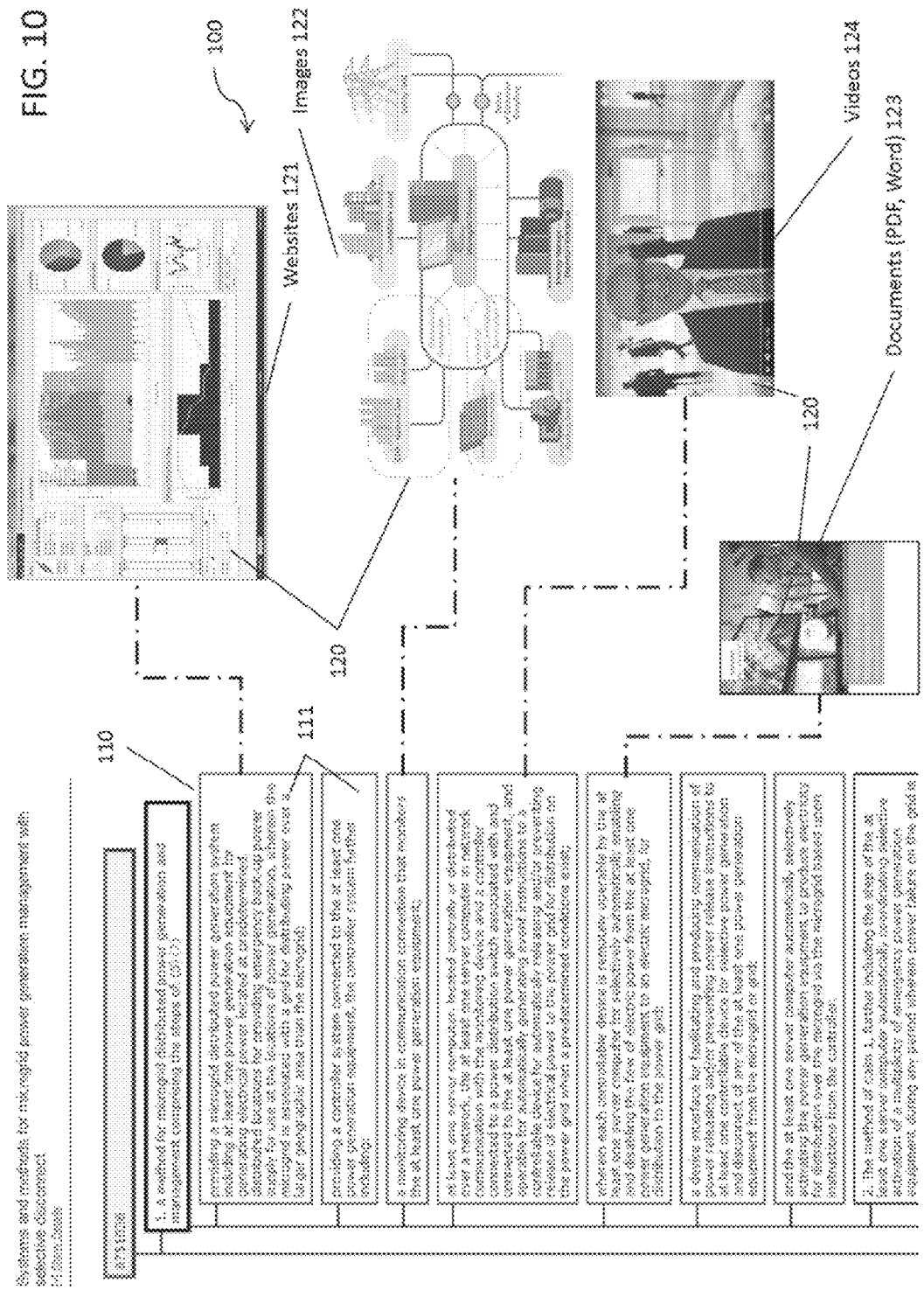
FIG. 10 is a user interface of a claims diagram with relevant technology content thumbnail images.

The present invention further provides for real-time, automated analysis of claims to assist in determining infringement by competitors in real-time or near-real-time. An interface provides a patent claims diagram as previously described with additional content of potential patent claims infringers shown diagrammatically connected to the claims elements and sub-elements. FIG. 10 illustrates an embodiment of this feature, showing a user interface, generally described as 100, with sub-elements 111 of a patent claims diagram 110 linked to matching technology content thumbnail images 120. The content is selected from at least one form of media, by way of example and not limitation, websites 121, images 122, documents (PDF, Word) 123, videos 124, product specifications, user manuals, advertisements, marketing collateral, competitive product comparisons and the like.

The present invention analyzes the elements or sub-elements and then searches in real-time for matching technology content. Once content is located, a semantics engine analyzes in real-time the meaning of the content to determine if it qualifies as matching technology content. Once it is determined to be matching technology content, the semantics engine determines in real-time if the purpose of the content meets the requirements of the study. By way of example and not limitation, the semantics engine would analyze the content and its context to determine if the content was an offer to sell, which would qualify as matching technology content, or a technology review article, which would not qualify.

Figure 11:
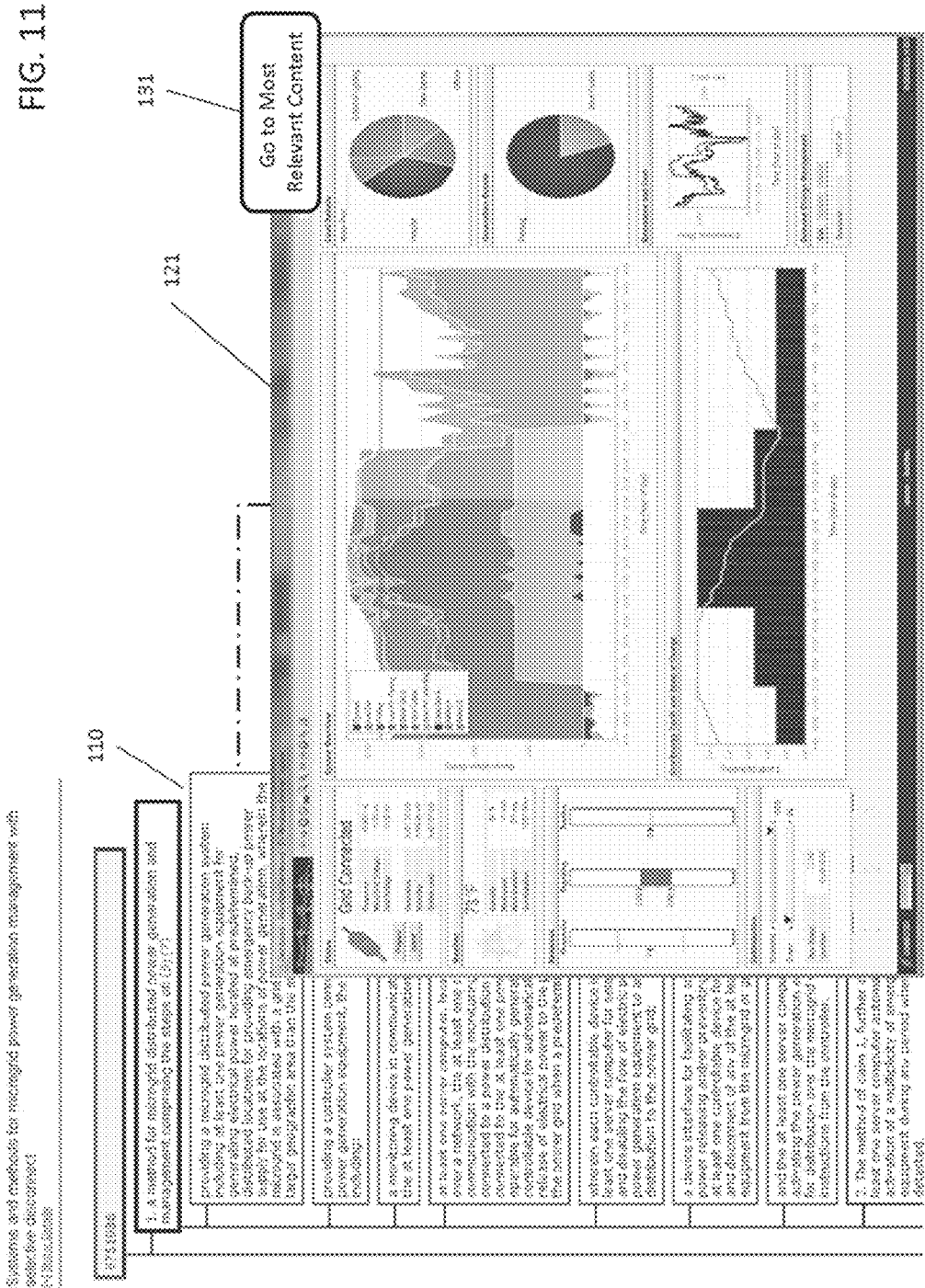
FIG. 11 is a user interface of a claims diagram and relevant technology content with a relevant technology content expanded for examination.

Selecting a matching technology content thumbnail image brings the content to the foreground and expands it to fill the interface, to fill a predetermined pane in the interface, or to a predetermined size (FIG. 11). Preferably, the expanded content does not obscure the parent linked key component. This method of presenting content is much more memorable that the prior art methods, an example of which is shown in FIG. 12. Here the various claims elements, represented as 201, 202, 203, etc. and the various potential infringers, represented as 301-306, are arranged in a table to form a matrix. If matching technology content is found, then a notation (X) is made in the table at the appropriate cell.

A method according to the present invention (FIG. 13) includes the steps of 1) receiving a patent number or other means of identification, 2) importing the patent claims, 3) parsing the claims and displaying them diagrammatically, 4) receive sub-element selections, 5) analyzing the selected sub-elements to determine keywords, 6) searching a database for matching technology content using the keywords, 7) retrieving matching technology content, 8) analyzing the retrieved content to determine if the record is relevant to the purpose of the study, 9) if relevant, displaying the matching technology content thumbnail images beside the patent claims diagram and linking the thumbnail images to the appropriate sub-element(s), and 10) periodically updating the search results for matching relevant content. If the retrieved record is not relevant, then the record is discarded. Additional steps include receiving edits and annotations to the diagram components.

Note that the same content can satisfy the criteria for more than one sub-element, and therefore be linked to multiple sub-elements. In these cases, the system links a sub-element to the location in the document that is most relevant, based on semantic analysis of the sub-element.

In another embodiment, the system includes a "Go To Most Relevant Content" link, which appears upon the first expansion of a thumbnail (FIG. 12); clicking on this button brings up the most relevant content location for the linked sub-element.

FIG. 14 is a schematic diagram of an embodiment of the invention illustrating a computer system, generally described as 800, having a network 810, a plurality of computing devices 820, 830, 840, a server 850 and a database 870.

The server 850 is constructed, configured and coupled to enable communication over a network 810 with a computing devices 820, 830, 840. The server 850 includes a processing unit 851 with an operating system 852. The operating system 852 enables the server 850 to communicate through network 810 with the remote, distributed user devices. Database 870 may house an operating system 872, memory 874, and programs 876.

In one embodiment of the invention, the system 800 includes a cloud-based network 810 for distributed communication via a wireless communication antenna 812 and processing by a plurality of mobile communication computing devices 830. In another embodiment of the invention, the system 800 is a virtualized computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital computers 820, 840, 850 and mobile devices 830, such as a server, blade server, mainframe, mobile phone, a personal digital assistant (PDA), a smart phone, a desktop computer, a netbook computer, a tablet computer, a workstation, a laptop, and other similar computing devices. The components shown here, their connections and relationships, and their functions, are meant to be exemplary only, and are not meant to limit implementations of the invention described and/or claimed in this document In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers) or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 14, multiple processors 860 and/or multiple buses 868 may be used, as appropriate, along with multiple memories 862 of multiple types (e.g., a combination of a DSP and a microprocessor, a plurality of microprocessors, one or more microprocessors in conjunction with a DSP core).

Also, multiple computing devices may be connected, with each device providing portions of the necessary operations (e.g., a server bank, a group of blade servers, or a multi-processor system). Alternatively, some steps or methods may be performed by circuitry that is specific to a given function.

According to various embodiments, the computer system 800 may operate in a networked environment using logical connections to local and/or remote computing devices 820, 830, 840, 850 through a network 810. A computing device 830 may connect to a network 810 through a network interface unit 896 connected to the bus 868. Computing devices may communicate communication media through wired networks, direct-wired connections or wirelessly such as acoustic, RF or infrared through an antenna 897 in communication with the network antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications or other data embodying any one or more of the methodologies or functions described herein. The computer readable medium may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory or other solid state memory technology, disks or discs (e.g., digital versatile disks (DVD), HD-DVD, BLU-RAY, compact disc (CD), CD-ROM, floppy disc) or other optical storage, magnetic cassettes, magnetic tape, magnetic disk storage or other magnetic storage devices, or any other medium that can be used to store the computer readable instructions and which can be accessed by the computer system 800.

It is also contemplated that the computer system 800 may not include all of the components shown in FIG. 14, may include other components that are not explicitly shown in FIG. 14, or may utilize an architecture completely different than that shown in FIG. 14. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

The present invention is necessarily rooted in computer technology in order to overcome a problem specifically arising in the realm of computer networks. More specifically, the present invention electronically searches and parses, in real-time, millions of websites, documents, images and videos from around the planet to find the ones that are relevant. This immense amount of content, which cannot be parsed in real-time or near-real-time by humans, was not available prior to the advent of the Internet. Prior to the Internet, litigators would have to deal with hundreds or maybe thousands of documents per case, which required a large amount of time. Now, with the availability of millions of articles of content, there are not enough persons trained in litigation to review all the content in real-time or near-real-time. Thus, this is a problem created by the Internet.

Additionally, the majority of these documents are only offered electronically and only through the Internet. Thus, it is not possible for users to search these documents except by using computer and electronic networking technology, including GUIs.

The GUIs described in the present invention are also a product of computer technology and Internet connectivity, and as such were unavailable before the Internet. Specifically, the hierarchical claims diagram displays and the expansion mechanisms which are operable to expand dependent claims and dependent claim text were not available before computing technology and the Internet.

Additionally, the present method differs from prior art manual methods. Specifically, the present method first searches for technology keywords, and then determines if the document is relevant to the purpose of the study. In prior art manual methods, the searcher would first determine if a document was relevant to the purpose of the study, and then determine if the technology content in the document was relevant.

Furthermore, the high-throughput, real-time screening necessitated by the enormous number of documents along with the constraints of computer displays requires technological features that did not exist before the Internet. Specifically, the need to review multiple electronic documents in real-time within a fixed monitor requires an interactive method that can toggle rapidly between documents. The GUIs described in the present invention provides this ability.

Certain modifications and improvements will occur to those skilled in the art upon a reading of the foregoing description. By way of example, the diagrams are preferably operable to provide for user annotation. Also, it is preferred that the diagrams are representable in a multiplicity of formats, depending upon user preference, such as .html. Also, electronic representations of the diagrams are electronically linked to the underlying documents from which the claims were identified and/or parsed, for providing quick comparison between them. All modifications and improvements have been deleted herein for the sake of conciseness and readability but are properly within the scope of the following claims.

What is claimed is:

1. A system for analyzing patent claims, the system comprising:
   at least one input device in communication with at least one computer and at least one output device, wherein the at least one computer is capable of storing, modifying, outputting, and retrieving information via an electronic network from the at least one input device and the at least one output device;
   at least one database, the database in network communication with the at least one computer; and
   software installed and capable of running on the at least one computer for automatically:
   importing patent claims via the electronic network based upon the user inputted information;
   parsing the imported patent claims hierarchically, wherein each independent claim is parsed into its invention sub-elements, wherein an invention sub-element is a parsed patent invention element or a step of the independent patent invention claim, and wherein the hierarchically parsed patent claims comprises hierarchical elements and sub-elements;
   generating a hierarchical claims diagram comprising a textual claim content associated with each patent claim, and
   outputting the hierarchical claims diagram, wherein, for each patent claim, the hierarchical claims diagram shows the parsed claims in an interactive format that is operable to dynamically expand and compress the textual claim content, according to the hierarchy of the imported patent claims;

receiving sub-element selections from the input device;

analyzing the sub-element selections for technology content;

searching the at least one database in real-time via the network for matching technology content;

receiving a study purpose;

analyzing in real-time via the network a matching technology content record for matching study purpose;

retrieving in real-time from the Internet the matching technology and study purpose content;

displaying on a GUI matching technology and study purpose content thumbnail images beside the patent claims diagram; and visually linking the thumbnail images to their sub-element.

2. The system of claim 1, wherein the at least one database is a distributed database.

3. The system of claim 2, wherein the distributed database is hosted on the Internet.

4. The system of claim 1, wherein the system expands the matching technology and study purpose content to a predetermined size upon receiving a thumbnail image selection.

5. The system of claim 4, wherein the system displays the most relevant content upon expansion.

6. The system of claim 4, wherein the system displays a link to the most relevant content location upon expansion.

7. The system of claim 1, further including a server in communication with the at least one computer and the at least one database, and wherein the server semantically analyzes the sub-elements and database results to find technology and study purpose matches.

8. The system of claim 7, wherein the thumbnail images dynamically expand and compress with the claims diagram.

9. A method for displaying patent claims comprising:

providing a system, the system comprising a server in electronic network communication with at least one database; a client device with GUI and software; the server and at least one client device in communication over an electronic network; the server or the at least one client device running software for performing the following steps:

importing, via the electronic network, patent claims based upon user inputted information;

parsing the imported patent claims hierarchically;

generating a hierarchical claims diagram comprising a textual claim content associated with each patent claim, and outputting the hierarchical claims diagram on a GUI on a display, wherein, for each patent claim, the hierarchical claims diagram shows the parsed claims in an interactive format that is operable to dynamically expand and compress the textual claim content, according to the hierarchy of the imported patent claims;

receiving sub-element selections;

analyzing the sub-element selections for technology content;

searching the at least one database for matching technology content;

retrieving the matching technology content;

receiving a study purpose;

analyzing the matching technology content record for matching study purpose;

retrieving from the Internet the matching technology and study purpose content;

displaying matching technology and study purpose content thumbnail images on the GUI beside the patent claims diagram; and displaying matching technology content thumbnail images beside the patent claims diagram; and linking the thumbnail images to their sub-element.

10. The method of claim 9, wherein the at least one database is a distributed database.

11. The method of claim 10, wherein the at least one database is an Internet-distributed database.

12. The method of claim 9, wherein the system expands the matching technology content to a predetermined size upon receiving a thumbnail image selection.

13. The method of claim 9, wherein the system displays the most relevant content upon expansion.

14. The method of claim 9, wherein the system displays a link to the most relevant content location upon expansion.

15. The method of claim 9, further including a server in communication with the computer and the at least one database, wherein the server semantically analyzes the sub-elements and database results to find technology and study purpose matches.

* * * * *